United States Patent [19]

Kaul

[11] 4,161,544

[45] Jul. 17, 1979

[54] PROCESS FOR MAKING A POURABLE MATERIAL FOR CHEWING GUM

[76] Inventor: Dieter Kaul, Vosskuhlen 6, 2200 Elmshorn, Fed. Rep. of Germany

[21] Appl. No.: 884,878

[22] Filed: Mar. 9, 1978

[30] Foreign Application Priority Data

Mar. 11, 1976 [DE] Fed. Rep. of Germany ....... 2710579

[51] Int. Cl.² ............................................... A23G 3/30
[52] U.S. Cl. ............................................ 426/5; 426/3
[58] Field of Search ......................................... 426/3, 5

[56] References Cited

U.S. PATENT DOCUMENTS

| 3,075,884 | 1/1963 | Bilotti ....................................... 426/5 |
| 3,262,784 | 7/1966 | Bucher ...................................... 426/5 |
| 3,912,817 | 10/1975 | Sapsowitz ................................. 426/5 |
| 4,000,321 | 12/1976 | Mochizuki et al. ...................... 426/3 |

*Primary Examiner*—Jeanette M. Hunter
*Attorney, Agent, or Firm*—Allison C. Collard; Thomas M. Galgano

[57] ABSTRACT

Process for making a pourable material for chewing gum by adding to a dry base of chewing gum heated to about 60°–120° C., dry sugar materials, polysaccharides, natural gums and swelling agents, or mixtures thereof, mixing the mass at this temperature for about 1–15 minutes, subsequently cooling the mixture to a temperature of from 30–minus 5° C. and continuing the mixing for about 1–15 minutes.

11 Claims, No Drawings

PROCESS FOR MAKING A POURABLE MATERIAL FOR CHEWING GUM

The invention relates to a process for making a pourable-non-caking material for chewing gum and a device for carrying out the process. The invention also relates to chewing gum made from this material in compressed form.

Up to the present, materials for chewing gum are conventionally made by using syrup, especially glycose syrup as an additive. The addition of syrup, which essentially influences the consistency of chewing gum products, results in masses which can only be made into shapes of very limited range by the use of extrusion presses or rollers with subsequent cutting or otherwise separating of the mass. More particularly, it is not possible to compress the masses into tablets or figures.

For overcoming this disadvantage, a process has already been proposed for making a chewing gum material leading to a crumbling, pulverulent mixture, which can be shaped by simple compression and can be mixed with other finely dispersed substances or liquids. However, this known chewing gum material is hard, and will, therefore, not yield a satisfactory end product. Furthermore, this mass has to be subjected to a special grinding process before being compressed, because it consists of larger or small agglomerates.

It is the object of the present invention to provide a process and device which will overcome the shortcomings of the known chewing gum materials.

More particularly, it is an object of the invention to provide a pourable powder for making chewing gum with simple means and at low expenses, which will remain pourable at normal temperatures even after storage, without forming agglomerates.

It is another object of the invention to provide materials which can be easily compressed into various shapes.

Other objects and advantages of the process and device of the invention will become apparent from the following detailed description.

The above objects can be accomplished according to the invention, by starting from a dry base material heated to a temperature of 60°-120° C. and adding thereto dry sugar materials such as saccharose, dextrose, xylite, mannite, and sorbit, polysaccharides, natural gums and swelling agents, mixing the ingredients at the aforementioned temperature for about 1-15 minutes, thereafter cooling the mixture to about 30-minus 5° C. and continuing the mixing operation for another 1-15 minutes.

The polysaccharides maybe starch, physically or chemically modified starch, for instance, surface-treated starch, amylated starch, esterified or etherified starch, or partly chemically or enzymatically degraded starch having a DE-value of maximally 40; also cellulose, cellulose derivatives, e.g., methylated or carboxylated cellulose, as well as partly hydrolysed cellulose. The natural gums may be gum arabic or pectines. Useful swelling agents are tragacanth, guar gum, carob gum, carragans, alginic acids, alginates, gelatine or agar agar.

It is, of course, possible to use mixtures of the above named compounds. The invention also comprises the possibility of using the substances or their mixtures with an addition of glucose syrup, dissolved or dispersed in water and subsequently subjected to spray drying or roller drying. The amount of glucose syrup should be such that the DE-value of the dry mixture is maximally 40. The device for carrying out the process of the invention may consist of a speed mixer of known design which can be used at the temperature of 60°-120° C., and which has an rpm of 6000; for the subsequent mixing at a temperature of 30-minus 5° C., a cooling mixer of known design may be used which is supposed to run at 150 rpm. The two mixers may be combined into a single mixer with adjustable rpm having a heating and a cooling unit. The mixing operations may also be carried out in a kneading device with appropriate heating and cooling means. The product made according to the invention is especially intended to serve for the production of compressed chewing gum is pressure molds, where it is to be formed into tablets, lozenges, figures, sticks, granulates, and the like.

In the following, the invention will be more fully described in a number of examples, which are given by way of illustration and not of limitation. All percentages are by weight.

EXAMPLE 1

| | | |
|---|---|---|
| a) | Base | 20% |
| b) | Glucose syrup DE 40 | 9% |
| c) | guar gum | 0.50% |
| d) | Starch (degraded by Oxidation) | 20% |
| e) | Powdered Sugar | 49.70% |
| f) | Flavoring | 0.80% |

The chewing gum base (commercial quality) is passed into a speed mixer of known design which is first heated to 60° C. After the base has become plastic, glucose syrup is added first and then the mixture of substances c, d, and e is added. The mass is mixed for 5 minutes and conveyed to a cooling mixer of known design. As soon as a temperature of 50° C. has been reached, flavoring agent is added, whereupon the mass is cooled down to 20° C., with coarse crumbs being formed first, which disintegrate and form a pourable powder when room temperature is reached. The powder is conveyed to a tabletting machine over a vibrating screen (mesh about 1 mm) and compressed to the desired shape. The portion of the chewing gum powder, which does not pass the screen, is returned to the speed mixer and processed with the next batch.

EXAMPLE 2

| | | |
|---|---|---|
| a) | Base | 20% |
| b) | Glucose syrup | 9.50% |
| c) | Carob gum | 0.50% |
| d) | Amylopectin Starch | 19.20% |
| e) | Powdered Sugar | 50.0% |
| f) | Flavoring | 0.8% |

The operations are carried out as in Example 1, with the exception that the speed mixer has a wall temperature of 70° C. and the mixing time is 2 minutes.

EXAMPLE 3

| | | |
|---|---|---|
| a) | Base | 20% |
| b) | Glucose Syrup DR 40 | 8% |
| c) | Maltose Dextrin DE 8 | 21.50% |
| d) | Tragacanth | 0.50% |
| e) | Powdered Sugar | 49.20% |

-continued

|   |   |   |
|---|---|---|
| f) | Flavorings | 0.80% |

Processing is carried out as in Example 1.

EXAMPLE 4

|   |   |   |
|---|---|---|
| a) | Base | 25.0% |
| b) | Gum Arabic | 1% |
| c) | Native Potato starch | 32% |
| d) | Dextrose | 41.20% |
| e) | Flavoring | 0.80% |

The base is passed into a sigma-kneader of known design with heating and cooling devices, which is first heated up to 60° C. (wall temperature). After the mass has become plastic, a mixture of gum arabic and potato starch is added, which is kneaded at 60° C. for 10 minutes and then cooled down to 35° C. Next flavoring is added and finally the dextrose. Obtained is a crumbly mass, which is transferred to a cooling mixer where it is cooled to 10° C. There results a hygroscopic powder which is rapidly packaged—if possible, maintaining the temperature of 10° C.—or is further processed.

While only several embodiments of the present invention have been described, it will be obvious to those persons of ordinary skill in the art that many changes and modifications may be made thereunto without departing from the spirit and scope of the invention.

What is claimed is:

1. A process for making a pourable material for chewing gum, which comprises the steps of:
   adding to a dry base of chewing gum heated to about 60° to 120° C. dry sugar materials, polysaccharides, natural gums and swelling agents;
   mixing and crushing the mass at this temperature for about 1–15 minutes;
   subsequently cooling the mixture to a temperature ranging from 30–minus 5° C., and continuing the mixing for about 1–15 minutes, so as to produce a pourable powder for making chewing gum, which will remain pourable at normal temperatures even after storage without forming agglomerates.

2. The process according to claim 1, wherein as sugar materials saccharose, dextrose, xylit, or mannit and sorbit are added.

3. The process according to claim 1, wherein as polysaccharides starch, physically or chemically modified starch, and partly chemically or enzymatically degraded starch having a DE-value of maximally 40 are added.

4. The process according to claim 2, wherein the polysaccharides added are cellulose, derivatives of cellulose, and partly hydrolyzed cellulose.

5. The process according to claim 1, wherein as natural gums gum arabic and pectines are used.

6. The process according to claim 1, wherein as swelling agents tragacanth, guar gum, carob gum, carragans, alginic acids, alginates, gelatine or agar agar are used.

7. The process according to claim 1, wherein mixtures of sugar materials, polysaccharides, natural gums and swelling agents are used as additions to the dry gum base.

8. The process according to claim 1, wherein glucose syrup dissolved or dispersed in water is added to the mass, which is subsequently subjected to spray or roller drying.

9. The process according to claim 8, wherein the DE-value of the dry mixture is adjusted to maximally 40.

10. Chewing gum material in compressed form and in the shape of tablets, figures, sticks, and granulates, when produced by the process according to claim 1.

11. A process for making a pourable powder for making chewing gum, which comprises the steps of:
    adding to a dry base of chewing gum heated to about 60° to 120° C. and received in a speed mixer operated at 300 to 600 rpm, dry sugar materials, polysaccharides, natural gums and swelling agents; and
    mixing the mass in the speed mixer at this temperature for about 1–15 minutes while said speed mixer is operated at 300–6000 rpm;
    subsequently cooling the mixture to a temperature ranging from 30–minus 5° C., in a cooling speed mixer while continuing the mixing thereof for about 1–15 minutes while said cooling speed mixer is operated at 20–150 rpm, so as to produce a pourable powder for making chewing gum, which will remain pourable at normal temperatures even after storage without forming agglomerates.

* * * * *